US011199328B2

United States Patent
Maurer et al.

(10) Patent No.: US 11,199,328 B2
(45) Date of Patent: Dec. 14, 2021

(54) METHOD FOR MANUFACTURING A BURNER ASSEMBLY FOR A GAS TURBINE COMBUSTOR AND BURNER ASSEMBLY FOR A GAS TURBINE COMBUSTOR

(71) Applicant: ANSALDO ENERGIA SWITZERLAND AG, Baden (CH)

(72) Inventors: Michael Maurer, Bad Säckingen (DE); Christoph Gaupp, Zurich (CH)

(73) Assignee: ANSALDO ENERGIA SWITZERLAND AG, Baden (CH)

( * ) Notice: Subject to any disclaimer, the term of this patent is extended or adjusted under 35 U.S.C. 154(b) by 252 days.

(21) Appl. No.: 15/894,342

(22) Filed: Feb. 12, 2018

(65) Prior Publication Data

US 2018/0231254 A1 Aug. 16, 2018

(30) Foreign Application Priority Data

Feb. 13, 2017 (EP) .................................. 17155877

(51) Int. Cl.
  *F23R 3/00* (2006.01)
  *F23R 3/36* (2006.01)
  *F23R 3/34* (2006.01)
  *B33Y 80/00* (2015.01)

(52) U.S. Cl.
  CPC ............... *F23R 3/36* (2013.01); *F23R 3/343* (2013.01); *B33Y 80/00* (2014.12); *F05D 2230/31* (2013.01); *F23R 2900/00018* (2013.01)

(58) Field of Classification Search
CPC .. F23R 3/36; F23R 3/343; F23R 2900/00018; F05D 2230/30; F05D 2230/31
See application file for complete search history.

(56) References Cited

U.S. PATENT DOCUMENTS

| 3,022,630 A | * | 2/1962 | Mccollum | ............... F23R 3/343 |
| | | | | 60/39.826 |
| 9,528,705 B2 | | 12/2016 | Melton | |
| 10,190,774 B2 | | 1/2019 | Mook et al. | |
| 10,232,440 B2 | | 3/2019 | Melton | |

(Continued)

FOREIGN PATENT DOCUMENTS

| CN | 104870902 A | 8/2015 |
| CN | 204943564 U | 1/2016 |

(Continued)

OTHER PUBLICATIONS

European Search Report of European Patent Application No. 17 15 5877, dated Jun. 21, 2017.

(Continued)

*Primary Examiner* — Katheryn A Malatek
(74) *Attorney, Agent, or Firm* — Buchanan Ingersoll & Rooney PC

(57) ABSTRACT

A method for manufacturing a burner assembly for a gas turbine combustor, having a pilot burner extending along a longitudinal axis, and a premix burner surrounding the pilot burner, wherein the method includes manufacturing at least one portion of the pilot burner by an additive manufacturing technique which includes manufacturing at least one first thermal bridge connecting parts of the pilot burner having a temperature difference not greater than a threshold value.

13 Claims, 3 Drawing Sheets

(56) References Cited

U.S. PATENT DOCUMENTS

| | | | |
|---|---|---|---|
| 10,591,164 B2 | 3/2020 | Patel et al. | |
| 2002/0124549 A1 | 9/2002 | Dittmann et al. | |
| 2006/0191268 A1* | 8/2006 | Widener | F23R 3/283 |
| | | | 60/772 |
| 2007/0231762 A1 | 10/2007 | Bernero et al. | |
| 2015/0275755 A1 | 10/2015 | Ogata et al. | |
| 2015/0285504 A1* | 10/2015 | Melton | F23R 3/283 |
| | | | 60/737 |
| 2015/0377491 A1 | 12/2015 | Sullivan et al. | |
| 2016/0252254 A1 | 9/2016 | Böttcher et al. | |
| 2016/0265780 A1 | 9/2016 | Patel et al. | |
| 2016/0279734 A1 | 9/2016 | Schick et al. | |
| 2016/0281606 A1 | 9/2016 | Heynen et al. | |
| 2017/0003029 A1* | 1/2017 | Mook | F23R 3/343 |
| 2017/0028651 A1* | 2/2017 | Versluys | B23K 37/04 |
| 2017/0050242 A1 | 2/2017 | Melton | |

FOREIGN PATENT DOCUMENTS

| | | |
|---|---|---|
| CN | 105829802 A | 8/2016 |
| CN | 105972643 A | 9/2016 |
| CN | 106001558 A | 10/2016 |
| EP | 2362138 A1 | 8/2011 |
| WO | WO 2009/126534 A1 | 10/2009 |
| WO | WO 2015/147935 A1 | 10/2015 |
| WO | WO 2016/138271 A1 | 9/2016 |

OTHER PUBLICATIONS

European Search Report of European Patent Application No. 17 15 5917, dated Jul. 18, 2017.
First Office Action dated May 7, 2020, by the Chinese Patent Office in corresponding Chinese Patent Application No. 201810148904.7, and an English Translation of the Office Action. (17 pages).

* cited by examiner

METHOD FOR MANUFACTURING A BURNER ASSEMBLY FOR A GAS TURBINE COMBUSTOR AND BURNER ASSEMBLY FOR A GAS TURBINE COMBUSTOR

PRIORITY CLAIM

This application claims priority from European Patent Application No. 17155877.8 filed on Feb. 13, 2017, the disclosure of which is incorporated by reference.

FIELD OF THE INVENTION

The present invention relates to a method for manufacturing a burner assembly for a combustor of a gas turbine power plant.

Moreover, the present application refers to a burner assembly for a gas turbine combustor.

DESCRIPTION OF PRIOR ART

As known, a gas turbine power plant (in the following only gas turbine) comprises a rotor provided with an air compressor, with at least one combustor, which is arranged downstream of the compressor and fed with the air coming from the compressor, and with at least one gas turbine, which is arranged downstream to the combustor and fed with the gas coming from the combustor that has undergone combustion.

More in detail, the compressor comprises an inlet supplied with air and a plurality of blades and vanes configured for compressing the air entering the compressor. The compressed air leaving the compressor flows into a plenum and from there into at least one burner assembly of the combustor. Inside the burner assembly, the compressed air is mixed with at least one fuel. The mixture of such fuel and the compressed air is combusted in the combustor chamber. The resulting hot gas leaves the combustor chamber and expands in the turbine performing work on the rotor.

The burner assembly used in gas turbines of the last generation are preferably of the premix type, as they are characterized by low emissions. This kind of burner assembly is known, for example from document US 2007/0231762. Said burner assembly comprises a premix burner and a pilot burner. The premix burner is configured so as to swirl incoming combustion air and mix it with the fuel into a premix region.

The pilot burner comprises a pilot lance centrally arranged in the burner assembly. At low operating loads, the pilot lance is configured to inject fuel into the combustion air axially in order to create fuel-rich zones ensuring that flame being not extinguished. At higher operating loads, the injection of fuel via the pilot lance is lowered in order to reduce pollutants, and the injection of fuel via the premix burner is increased.

The known methods for manufacturing burner assemblies requires complex machining and assembling operations and are not sufficiently flexible and cost-effective. In particular, the shapes obtainable by known methods are limited and, moreover, the burner assemblies obtained by the known methods have a heavy structure requiring an high amount of material.

An object of the present invention is therefore to provide a method for manufacturing a burner assembly that enables avoiding, or at least mitigating, the described drawbacks.

In particular, it is an object of the present invention to provide a method for manufacturing a burner assembly which simplifies the manufacturing operations and, at the same time, is sufficiently flexible, reliable and cost-effective.

It is therefore an object of the present invention to provide a method for manufacturing a burner assembly for a gas turbine combustor; the burner assembly comprising a pilot burner extending along a longitudinal axis and a premix burner surrounding the pilot burner;

the method comprising the step of manufacturing at least one portion of the pilot burner by means of an additive manufacturing technique; wherein the step of manufacturing at least one portion of the pilot burner comprises manufacturing at least one first thermal bridge connecting parts of the pilot burner; wherein the temperature difference between said parts of the pilot burner is lower than a threshold value.

In this way the method for manufacturing a burner assembly according to the present invention is rapid, simple and cost effective. Moreover the application of additive manufacturing technique allow to obtain monolithic pieces of the pilot burner. This has the effect of increasing the natural frequencies of the pilot burner and, consequently, of increasing the wear resistance of the pilot burner. Furthermore, thanks to the presence thermal bridge the structure of the lance could be light and, at the same time, sufficiently stiff and reliable. A structure of this type can be manufactured in a more cost-effective way.

According to a preferred embodiment of the present invention, the parts of the pilot burner connected by the first thermal bridge are distinct elements of the pilot burner.

According to a preferred embodiment of the present invention, the step of manufacturing at least one portion of the pilot burner comprises manufacturing a lance which is provided with an end tip, with a first conduit supplied, in use, with a first fuel, and with a second conduit supplied, in use, with air.

According to a preferred embodiment of the present invention, the first thermal bridge connects at least one wall of the first conduit having the temperature of the first fuel with a wall of the second conduit having the air temperature.

According to a preferred embodiment of the present invention, the first thermal bridge is hollow so as to create a channel for the passage of a fluid.

According to a preferred embodiment of the present invention, the step of manufacturing at least one portion of the pilot burner comprises manufacturing a third conduit of the lance supplied, in use, with a second fuel and at least one second thermal bridge connecting at least one wall of the third conduit having the temperature of the second fuel with a wall of the first conduit having the temperature of the first fuel.

According to a preferred embodiment of the present invention, the step of manufacturing at least one portion of the pilot burner comprises manufacturing at least one third thermal bridge connecting at least one wall of the second conduit having the air temperature with a wall of the end tip having the temperature of the interior of the combustor.

Thanks to the presence of the second thermal bridge and/or of the third thermal bridge, the structure of the pilot burner can be ever more lighter than the structure of the pilot burners of the prior art solutions and, at the same time, sufficiently resistant and reliable, with evident advantages in terms of manufacturing costs, especially in the case of additive manufacturing techniques.

According to a preferred embodiment of the present invention, the step of manufacturing at least one portion of the pilot burner comprises the following steps:

determining three dimensional information of the portion of the pilot burner to be manufactured;

converting the three dimensional information into a plurality of cross sectional layers;

forming a support structure comprising a support portion laying on a base plate and an excess portion laying on the support portion;

forming the portion of the pilot burner by adding each cross sectional layer previously defined on a support structure;

cutting away the support structure.

In this way, complex three-dimensional geometries of the pilot burner can be manufactured in a rapid and cost effective way. After the cutting, in fact, the portion of the pilot burner is ready to be used and does not need any further machining steps or treatment. Consequently, the costs of the manufacturing method according to the present invention are greatly reduced with respect to the ones of the prior art solutions.

Moreover the fact that an excess portion is created and then cut away guarantees great precision of the method according to the present invention. It is fact possible obtaining pilot burners having an advanced structure in a rapid, simple and cost effective way.

According to a preferred embodiment of the present invention, said step of forming the support structure comprises the step of forming the excess portion by adding at least one excess layer on the support portion; the excess layer being identical to the first cross sectional layer to be added on the support structure.

A further object of the present invention is to provide a burner assembly which has a structure which is simple, economic and is, at the same time, reliable and efficient.

According to the present invention, there is provided a burner assembly for a gas turbine combustor comprising a pilot burner extending along a longitudinal axis and a premix burner surrounding the pilot burner; the pilot burner comprising at least one first thermal bridge connecting parts of the pilot burner; wherein the temperature difference between said parts of the pilot burner is lower than a threshold value.

According to a preferred embodiment of the present invention, wherein the parts of the pilot burner connected by the first thermal bridge are distinct elements of the pilot burner.

According to a preferred embodiment of the present invention, the pilot burner comprises a lance which is provided with an end tip, with a first conduit supplied, in use, with a first fuel, and with a second conduit supplied, in use, with air.

According to a preferred embodiment of the present invention, the first thermal bridge connects at least one wall of the first conduit having the temperature of the first fuel with a wall of the second conduit having the air temperature.

According to a preferred embodiment of the present invention, the pilot burner comprises a third conduit supplied, in use, with a second fuel and at least one second thermal bridge connecting at least one wall of the third conduit having the temperature of the second fuel with a wall of the first conduit having the temperature of the first fuel.

According to a preferred embodiment of the present invention, the pilot burner comprises at least one third thermal bridge connecting at least one wall of the first conduit having the temperature of the first fuel with a wall of the end tip having the temperature of the interior of the combustor.

The present invention will now be described with reference to the accompanying drawings, which illustrate some non-limitative embodiment, in which.

Figure 1:
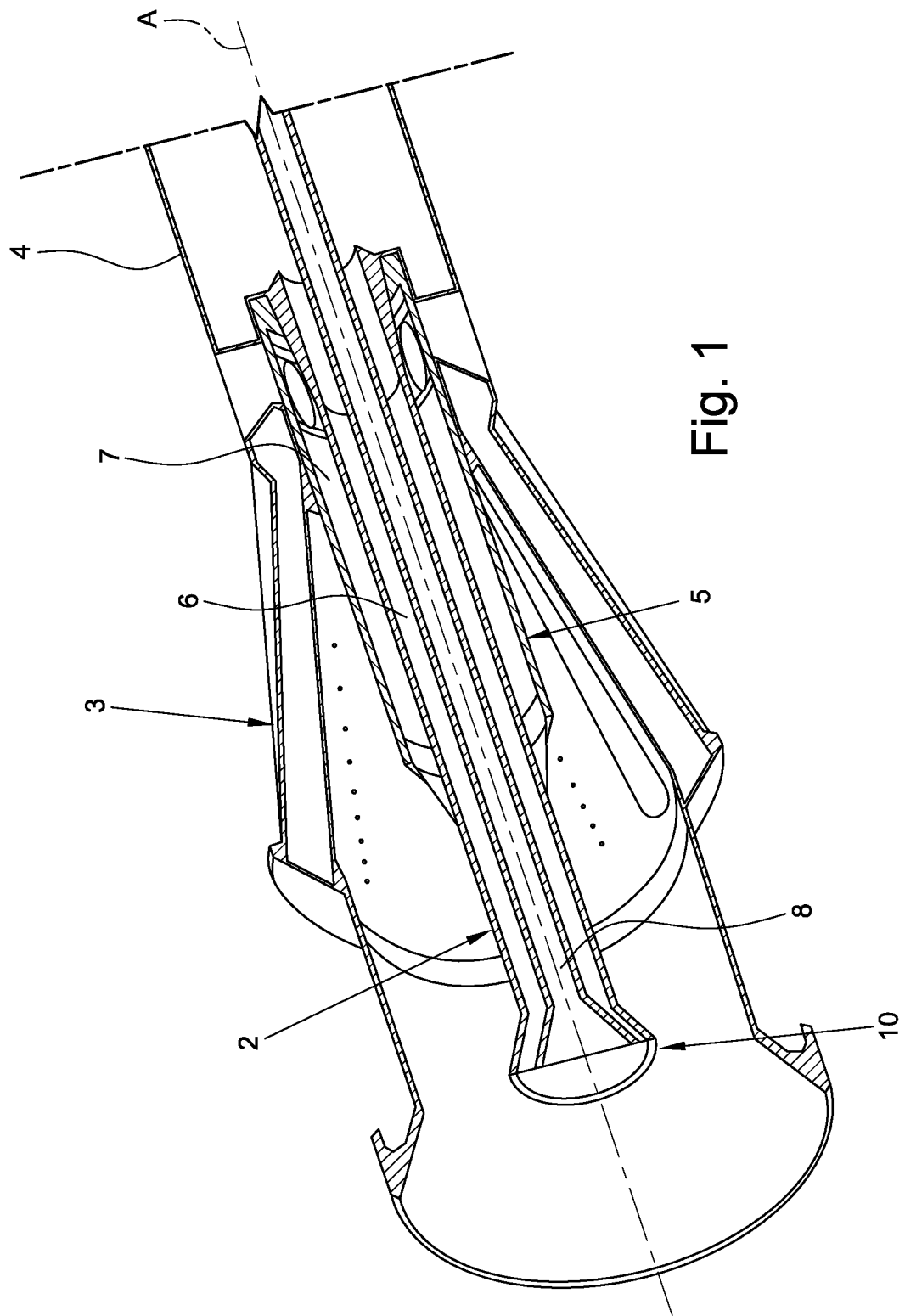
FIG. 1 is a schematic perspective view, with parts in section and parts removed for sake of clarity, of the burner assembly according to the present invention.

Reference number 1 in FIG. 1 indicate a burner assembly for a gas turbine combustor (here not illustrated).

Burner assembly 1 comprises a pilot burner 2 extending along a longitudinal axis A and a premix burner 3 extending about the pilot burner 2.

Pilot burner 2 and premix burner 3 are coupled to a supply assembly 4 which is connected to a respective supply circuit (not illustrated).

The pilot burner 2 comprises a lance 5 which is provided with a first conduit 6 supplied, in use, with a first fuel, with a second conduit 7 supplied, in use, with air and with a third conduit 8 supplied, in use, with a second fuel.

Preferably the first fuel is gas and the second fuel is fuel oil.

Figure 2:
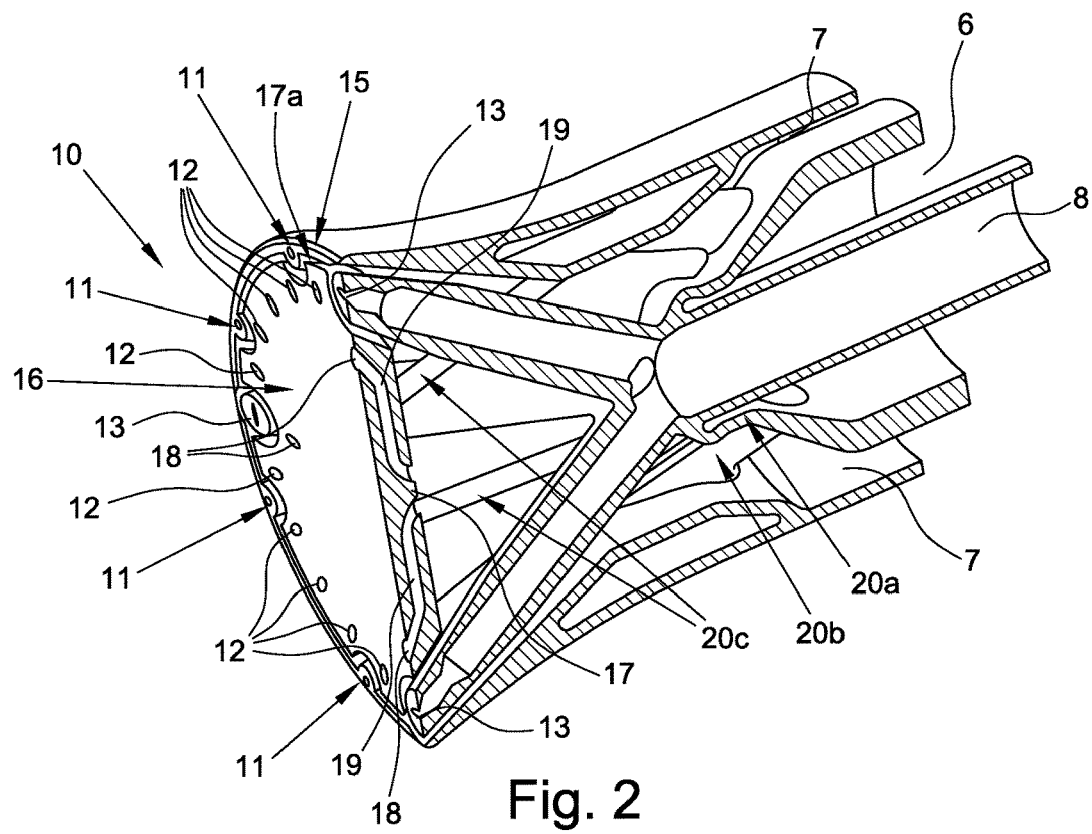
FIG. 2 is a schematic perspective view, with parts in section and parts removed for sake of clarity, of a first detail of the burner assembly of FIG. 1.

With reference to FIG. 2, the lance 5 has an end tip 10 provided with a plurality of first nozzles 11 connected to the first conduit 6, with a plurality of second nozzles 12 connected to the second conduit 7 and with a plurality of third nozzles 13.

The lance end tip 10 has preferably a substantially circular section and is provided with an edge 15. The end tip 10 comprises an end surface 16 which is defined by a respective end wall 17 and is preferably planar.

Preferably the end wall 17 is configured so as to leave at least one gap 17a between the edge 15 and the end wall 17 which is in communication with the second conduit 7.

The first nozzles 11 are arranged substantially equally spaced along a first circular path on the edge 15. In the non-limiting example here described and illustrated, the first nozzles 11 are eight.

The second nozzles 12 are arranged in groups, preferably in four groups each comprising five second nozzles.

The groups of second nozzles 12 are equally spaced along a second circular path on the end surface 16 of the end tip 10. Preferably, the second circular path is arranged inside the first circular path.

The third nozzles 13 are arranged substantially equally spaced along the second circular path preferably in the gap 17a. In particular, the third nozzles 13 are arranged in recesses of the end surface 16 between the groups of second nozzles 12.

The end tip 10 further comprises a plurality of cooling nozzles 18 which are supplied with the air of the second conduit 7. These cooling nozzles 18 are arranged substantially equally spaced along a third circular path on the end surface 16. Preferably, the third circular path is arranged inside the second circular path. The fourth cooling nozzles 18 preferably define the exit openings of respective cooling channels 19 obtained in the end wall 17. These cooling channels 19 extends inside the end wall 17 in order to cool the end wall 17 itself. In this way the temperature of the end tip 10 is controlled.

In the non-limiting example here disclosed, the cooling channels 19 are four and extends along four respective distinct paths, which are orthogonal one with respect to the other. The cooling channels 19 have substantially a common inlet located at the centre of the end wall 17.

The lance 5 is also provided with at least one thermal bridge 20 configured to connect parts of the lance 5 having, is use, different operating temperatures.

In particular, the thermal bridge 20 is configured to connect walls and parts of the lance 5 having a controlled temperature difference ΔT.

In other words, the parts of the lance 5 connected by the thermal bridge 20 have a temperature difference ΔT lower than a threshold value.

The threshold value is preferably comprised in the range 300°-500°.

The presence of the thermal bridge 20 allows to avoid a physical connection between parts of the lance 5 having a temperature difference ΔT greater than a threshold value.

Parts of the lance 5 having a temperature difference ΔT greater than a threshold value are not connected either directly or by a thermal bridge connection.

In the non-limiting example here disclosed and illustrated the structure of the lance 5 according to the present invention is designed so as to avoid a physical connection between parts having low temperatures (for example parts in contact with oil having a temperature of about 15-50° C.) and parts in contact with the interior of the chamber of the combustor wherein the temperature is the highest (1350-1650° C.). The introduction of at least one thermal bridge 20 avoid this kind of undesired contacts.

In other words, the thermal bridges 20 are always connecting two parts of the lance 5 having the closest temperature level. For example the thermal bridges 20 can connect low temperature parts to mid temperature parts and mid temperature parts to high temperature parts.

In the lance 5 here disclosed and illustrated, the walls and parts surrounding the second conduit 8 supplied with oil, will have, more or less, the oil temperature due to the high heat transfer properties of fuel oil.

The walls and parts in contact with both gas and air will have a temperature comprised between the temperature of the gas and the temperature of the air, but probably more closer to the gas temperature, as the driving pressure of the fuel gas is much higher than the driving pressure of the air coming from the compressor.

The walls and parts in contact with air will have the air temperature.

The walls and parts in contact with both air and the interior of the combustor chamber have the highest temperature, i.e. the temperature of the interior of the combustor chamber.

In the non-limiting example here disclosed and illustrated the lance 5 comprises at least one thermal bridge 20a, at least one thermal bridge 20b and at least one thermal bridge 20c.

The thermal bridge 20a connects the walls of the second conduit 8 having the oil temperature with the walls of the first conduit 6 having the gas temperature.

The thermal bridge 20b connects the walls of the first conduit 6 having the gas temperature with the walls of the second conduit 7 having the air temperature. In the non-limiting example here disclosed, the lance 5 comprises a plurality of thermal bridges 20b which are hollow and configured to create a channel for the passage of gas.

The thermal bridge 20c connects the walls of the second conduit 7 having the air temperature with the end wall 17 having the temperature of the interior of the combustor chamber. In the non-limiting example here disclosed, the lance 5 comprises a plurality of thermal bridges 20c.

Thanks to the thermal bridges 20 the structure of the lance 5 could be light and, at the same time, sufficiently stiff and reliable. A structure of this type can be manufactured in a more cost-effective way as will be discussed in the following.

The premix burner 3 is preferably defined by a swirler having the shape of a cone envelope and provided with air slots and fuel nozzles.

Figure 3:
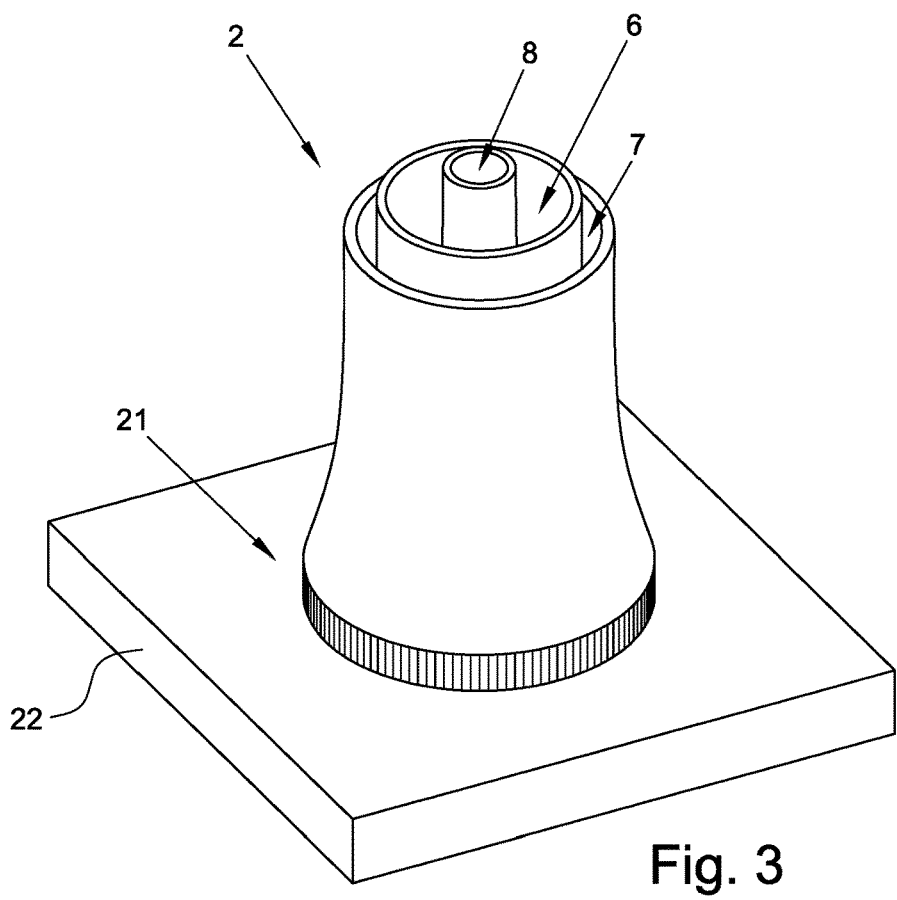
FIG. 3 is a schematic perspective view of a second detail of the burner assembly during a first step of the method for manufacturing a burner assembly according to the present invention.
Figure 4:
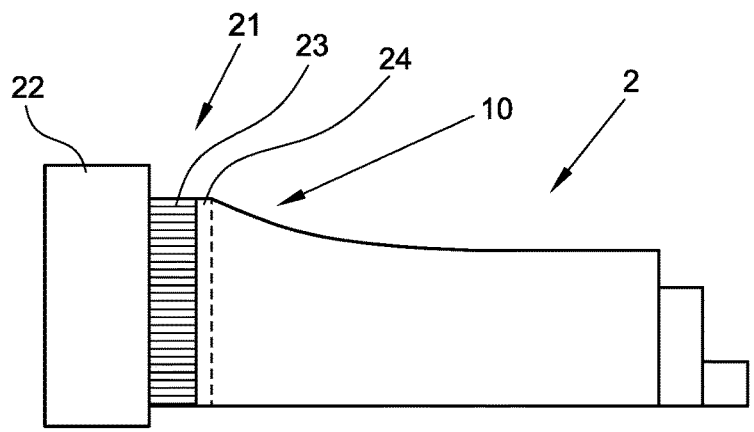
FIG. 4 is a schematic lateral view of the second detail of the burner assembly during the first step of FIG. 3.
Figure 5:
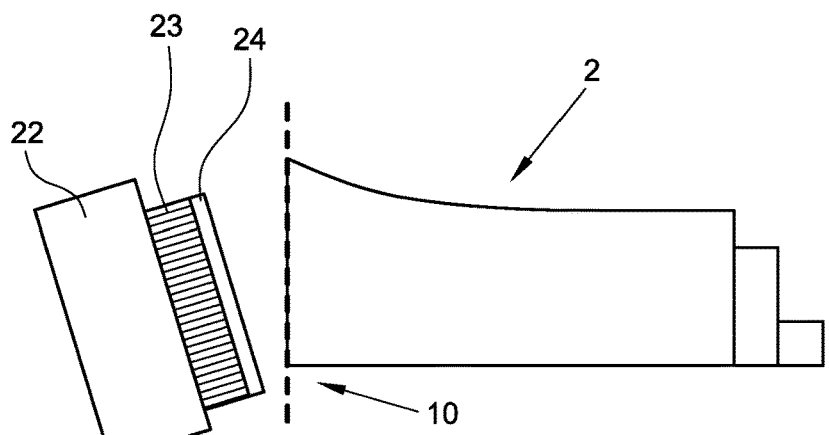
FIG. 5 is a schematic lateral view of the second detail of the burner assembly during a second step of the method for manufacturing a burner assembly according to the present invention.

FIG. 3 illustrates a portion of the pilot burner 2 during a step of the method for manufacturing a burner assembly of a gas turbine combustor of the present invention.

In particular, FIG. 3 illustrates a portion of the pilot burner during the step of manufacturing at least one portion of the pilot burner 2 by means of an additive manufacturing technique.

The definition "additive manufacturing technique" here means all the rapid manufacturing techniques using layer-by-layer constructions or additive fabrication. This definition includes, but it is not limited to, selective laser melting (SLM), selective laser sintering (SLS), Direct Metal Laser Sintering (DMLS), 3D printing (such as by inkjets and laserjets) sterolithography, direct selective laser sintering (DSLS), electron beam sintering (EBS), electron beam melting (EBM) laser engineered net shaping (LENS), laser net shape manufacturing (LNSM) and direct metal deposition (DMD).

With the term "layer" hereinafter is intended a layer of material in the form according to the additive manufacturing technique used. In the figures the layers are not indicated as they are typical too thin (approximately between 20-40 μm) to be clearly represented.

In the non-limiting example here disclosed and illustrated, the step of manufacturing at least one portion of the pilot burner 2 is performed by a selective laser melting (SLM) technique.

With reference to FIGS. 3, 4, 5 and 6 the step of manufacturing at least one portion of the pilot burner 2 comprises the following steps:
  determining three dimensional information of the portion of the pilot burner 2 to be manufactured;
  converting the three dimensional information into a plurality of cross sectional layers;
  forming the portion of the pilot burner 2 by adding each cross sectional layer previously defined on a support structure 21.

In the non-limiting example here disclosed and illustrated, the portion of the pilot burner 2 manufactured by means of an additive manufacturing technique is the end tip 10 of lance 5 of the pilot burner 2.

Variants of the method according to the invention provides that the portion of the pilot burner 2 manufactured by means of an additive manufacturing technique is the entire lance 5 or the entire pilot burner 2.

As previously stated, in the non-limiting example here disclosed and illustrated, adding each cross sectional layer comprises fusing a metallic powder using laser energy (SLM technique).

The support structure 21 has the function of defining a substrate on which the sectional layers previously defined can be lain.

The support structure 21 lays on a base plate 22.

Preferably, the support structure 21 comprises a support portion 23 laying on the base plate 22 and an excess portion 24 laying on the support portion 23.

The support portion 23 can be formed, according to the additive manufacturing technique used for forming the portion of the pilot burner 2, by adding at least one support layer on the base plate 22. Alternatively the support portion 23 can be formed according to anyone manufacturing technique.

The excess portion 24 is formed necessarily with the same additive manufacturing technique used for forming the portion of the pilot burner 2. In particular, the excess portion 24 is formed by adding at least one excess layer (not illustrated) on the support portion 23. The excess layer is identical to the first cross sectional layer to be added on the support structure 21.

In particular the excess portion 24 is formed by adding a plurality of excess layers so as to create an excess portion 24 having a thickness comprised between about 0.15 and about 5 mm. In the non-limiting example here disclosed and illustrated the excess portion 24 has a thickness comprised in the range of 0.15 mm-0.3 mm.

Figure 6:
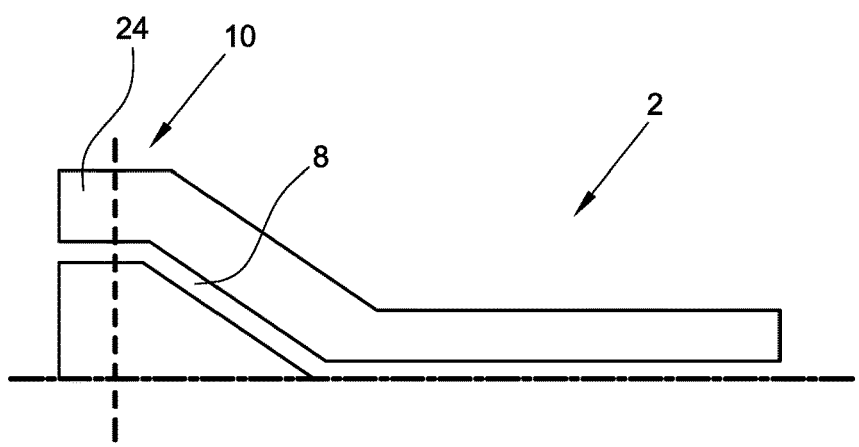
FIG. 6 is a schematic sectional view, with parts removed for sake of clarity, of an enlarged detail of the burner assembly during first step of FIG. 3.

In this way the excess portion 24 defines substantially a portion made of layers identical to the first cross sectional layer of the portion of the pilot burner 2 to be manufactured (see FIG. 6).

In the non-limiting example here disclosed and illustrated, the first cross sectional layer of the portion of the pilot burner 2 is the sectional layer corresponding to the end tip 10 of the lance 5. In other words, the forming of the portion of the pilot burner 2 starts with the deposition of the cross sectional layers corresponding to the end tip 10.

When the step of forming the portion of the pilot burner 2 is completed, the support structure 21 is cut away.

Preferably the support structure 21 is cut away according to a single wire EDM technique.

After the cutting, the portion of the pilot burner 2 is ready to be used and does not need any further machining steps or treatment. In this way the costs of the manufacturing method according to the present invention are greatly reduced with respect to the ones of the prior art solutions.

Advantageously, the method according to the present invention is more flexible with respect to the prior art solutions as the nozzles 11 12 13 18 of the end tip 10 of the lance 5 can have also complex shapes and also the entire structure of the lance 5 could be more complex: for example the lance 5 can comprise one or more thermal bridges 20.

Moreover the fact that an excess portion 24 as previously described is created and then cut away according to a single wire EDM technique guarantees great precision of the method according to the present invention.

The method according to the present invention has moreover the great advantage of allowing the manufacturing of a pilot burner 2 having an advanced structure (for example it comprises also cooling channels 19 and cooling nozzles 18) in a rapid, simple and cost effective way.

Finally, thanks to the claimed method the portion of the pilot burner 2 manufactured by means of an additive manufacturing technique is a monolithic piece. This has the effect of increasing the natural frequencies of the pilot burner 2 and, consequently, of increasing the wear resistance of the pilot burner 2.

According to a preferred embodiment of the present invention, the lance 5 is a monolithic piece.

According to a preferred embodiment of the present invention, the entire pilot burner 2 is a monolithic piece.

In the non-limiting example here disclosed, the method according to the present invention is applied to the manufacturing of a pilot burner comprising at least one thermal bridge 20. However the same method can be clearly used for manufacturing pilot burners not provided with the above described thermal bridge 20.

Finally, it is clear that modifications and variants can be made to the burner assembly and to the method described herein without departing from the scope of the present invention, as defined in the appended claims.

The invention claimed is:

1. A method for manufacturing a burner assembly for a gas turbine combustor, the burner assembly having a pilot burner extending along a longitudinal axis (A) and a premix burner surrounding the pilot burner, the method comprising:
    manufacturing at least one portion of the pilot burner by an additive manufacturing technique which includes:
        manufacturing a lance which is provided with an end tip, a first conduit supplied, in use, with a first fuel, and with a second conduit concentrically surrounding the first conduit supplied, in use, with air; and
        manufacturing at least one first thermal bridge extending from a first annular wall of the first conduit to a second annular wall of the second conduit connecting distinct parts of the pilot burner wherein, in use, a temperature difference (ΔT) between said distinct parts of the pilot burner is lower than a threshold value, wherein the at least one first thermal bridge connects the first annular wall of the first conduit having, when in use, a temperature of the first fuel with the second annular wall of the second conduit having, when in use, an air temperature;
    wherein the at least one first thermal bridge is hollow so as to create a channel within the at least one first thermal bridge for passage of the first fuel from the first conduit.

2. The method according to claim 1, wherein manufacturing the at least one portion of the pilot burner comprises:
    manufacturing a third conduit of the lance arranged to be supplied, in use, with a second fuel, and at least one second thermal bridge connecting at least one wall of the third conduit configured for a temperature of the second fuel with the at least one wall of the first conduit configured for the temperature of the first fuel.

3. The method according to claim 2, wherein manufacturing the at least one portion of the pilot burner comprises:
    manufacturing at least one third thermal bridge connecting the wall of the second conduit configured for air temperature with a wall of the end tip configured for a temperature of an interior of the combustor.

4. The method according to claim 1, wherein manufacturing the at least one portion of the pilot burner comprises:
    determining three dimensional information of the portion of the pilot burner to be manufactured;
    converting the three dimensional information into a plurality of cross sectional layers;
    forming a support structure having a support portion laying on a base plate and an excess portion laying on the support portion;
    forming the portion of the pilot burner by adding each cross sectional layer previously defined on the support structure; and
    cutting away the support structure.

5. The method according to claim 4, wherein said forming the support structure comprises:

forming the excess portion by adding at least one excess layer on the support portion, the excess layer being identical to a first cross sectional layer to be added on the support structure.

6. The method according to claim 1, wherein the at least one wall of the first conduit and the wall of the second conduit are within an outer wall of the pilot burner.

7. The method according to claim 1, wherein the channel of the at least one first thermal bridge has a first opening in the wall of the first conduit at a first end of the channel and a second opening in the wall of the second conduit at a second end of the channel.

8. The method according to claim 1, wherein the end tip is circular having an edge, an end surface defined by an end wall, and a gap between the edge and the end wall, the gap being in fluid communication with the second conduit.

9. The method according to claim 8, wherein the end tip includes a plurality of first nozzles arranged in a first circular formation on the edge, a plurality of second nozzles arranged in a second circular formation on the end surface, and a plurality of third nozzles arranged in the third circular formation in the gap.

10. The method according to claim 9, wherein the second circular formation and the third circular formation are arranged inside the first circular formation.

11. The method according to claim 9, wherein the plurality of first nozzles connect to the first conduit and the second plurality of nozzles connect to the second conduit.

12. The method according to claim 9, wherein the end tip includes a plurality of cooling nozzles arranged in a fourth circular formation on the end surface, each of the plurality of cooling nozzles defining an exit opening for a cooling channel contained inside the end wall, the cooling channels supplied with the air from the second conduit.

13. The method of claim 8, wherein the first fuel passes from the first conduit to a chamber supplying the plurality of first nozzles.

* * * * *